D. C. Ripley,
Glass Lamp,
No. 3,078. Reissued Aug. 11, 1868.
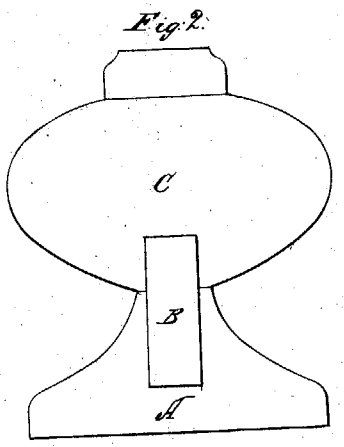
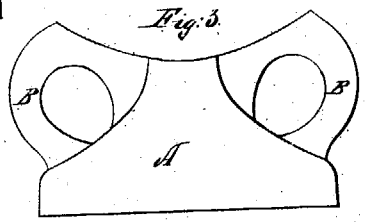
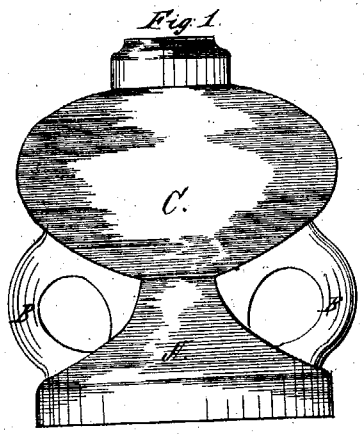
Witnesses:
A. J. Crapsey
Geo. Schaffer
Inventor:
D. C. Ripley
by Munn & Hammer
Mason.
N. PETERS, PHOTO-LITHOGRAPHER, WASHINGTON, D. C.

United States Patent Office.

RIPLEY AND COMPANY, OF PITTSBURG, PENNSYLVANIA, ASSIGNEES OF DANIEL C. RIPLEY, OF SAME PLACE.

*Letters Patent No.* 73,122, *dated January* 7, 1868; *reissue No.* 3,078, *dated August* 11, 1868.

DIVISION No. 1.

IMPROVED GLASS LAMP.

The Schedule referred to in these Letters Patent and making part of the same.

TO ALL WHOM IT MAY CONCERN:

Be it known that DANIEL C. RIPLEY, of Pittsburg, in the county of Allegheny, and State of Pennsylvania, did invent a new and useful Improvement in Portable Lamps; and we do hereby declare that the following is a full, clear, and exact description of that part of the invention which relates to Division No. 1, reference being had to the accompanying drawings, making a part of this specification, in which—

Figures 1 and 2 are side views of the improved lamp complete.

Figure 3 is a view of the base and handles of the improved lamp, without the bowl.

Similar letters of reference indicate corresponding parts in the several figures.

This invention relates to an improvement on portable or hand-lamps, and is designed to afford greater facility in handling such lamps, and in passing them from the hand of one person to that of another; also, to afford increased strength at the point where the bowl of a lamp is united to the base thereof, and to give a lamp a neater and more symmetrical appearance than hitherto.

The invention consists in constructing a portable lamp with two handles arranged diametrically opposite each other, so that such lamp can be taken from a person's hand by the handle which is on that side of the lamp opposite the handle held by such person, thereby rendering it unnecessary to grasp a lamp by its bowl or base during the act of passing it from one person to another.

To enable others skilled in the art to understand the invention, we will describe one form of the improved lamps.

The drawing represents a glass lamp, which is constructed with a conical base, A, two handles, B B, which are diametrically opposite each other, and a hollow bowl or globe, C.

This lamp may be produced in the following manner, although it is not intended to confine this invention to the process of producing the lamps, as they may be produced in any well-known process of working glass into useful articles.

The conical-base portion, A, with two handles, B B, is first produced, by casting or pressing glass into a mould which is suitably adapted for the purpose. In thus producing the base and handles of a lamp, of one piece of glass, a concave seat is left at the upper ends of said handles and base for receiving and supporting the bowl of the lamp.

The article thus produced, while in a properly-heated state, is put into a suitably-chambered mould and the bowl of the lamp blown upon it, thereby uniting the bowl, the handle, and the base, firmly together.

If the lamps are made in this manner, it will be seen that the two handles not only serve as handles, but they also serve as means for strengthening the lamp between its base and bowl. The two handles also beautify the lamp by making it symmetrical, and afford a means for handling a lamp without the necessity of grasping it by its bowl.

It is preferable to construct the improved lamps with cast bases and blown bowls, and to construct the handles upon the bases in the act of producing the latter, but the invention is not confined to this mode of producing a two-handled lamp.

Having described this invention, what is claimed, and desired to be secured by Letters Patent under this division, is—

A glass lamp, with two or more pressed handles, which are so formed and attached that they perform the double function of handles and braces between the base and the bulb or body of the lamp, substantially as described.

DANIEL C. RIPLEY,
GEORGE DUNCAN,
JACOB STRICKEL,
N. KUNZLAR.

Witnesses:
E. G. KREHAUR,
A. P. NORTON.